US012008933B2

(12) United States Patent
Wang et al.

(10) Patent No.: US 12,008,933 B2
(45) Date of Patent: Jun. 11, 2024

(54) SELF-MONITORING METHOD OF DISPLAY AND DISPLAY

(71) Applicants: BEIJING BOE DISPLAY TECHNOLOGY CO., LTD., Beijing (CN); BOE TECHNOLOGY GROUP CO., LTD., Beijing (CN)

(72) Inventors: Jianting Wang, Beijing (CN); Rui Guo, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/342,137

(22) Filed: Jun. 27, 2023

(65) Prior Publication Data

US 2023/0335026 A1 Oct. 19, 2023

Related U.S. Application Data

(63) Continuation of application No. 17/813,970, filed on Jul. 21, 2022, now Pat. No. 11,727,837, which is a (Continued)

(30) Foreign Application Priority Data

Apr. 26, 2018 (CN) ......................... 201810387205.8

(51) Int. Cl.
*G09G 3/00* (2006.01)

(52) U.S. Cl.
CPC ..... *G09G 3/006* (2013.01); *G09G 2320/0233* (2013.01); *G09G 2320/0242* (2013.01);
(Continued)

(58) Field of Classification Search
CPC ........... G09G 3/006; G09G 2320/0233; G09G 2320/0242; G09G 2320/04; G09G 2330/12; G09G 2360/16
See application file for complete search history.

(56) References Cited

U.S. PATENT DOCUMENTS 6,859,192 B1 2/2005 Ogawa
11,462,139 B2 * 10/2022 Wang ........................ G09G 3/20
(Continued)

FOREIGN PATENT DOCUMENTS

CN 103927954 A 7/2014
CN 105575302 A 5/2016
(Continued)

OTHER PUBLICATIONS

Chinese Patent Office Action dated Jul. 30, 2020 corresponding to Chinese Patent Application No. 201810387205.8 24 pages.
(Continued)

*Primary Examiner* — Dmitriy Bolotin
(74) *Attorney, Agent, or Firm* — Leason Ellis LLP

(57) ABSTRACT

A self-monitoring method of a display and a display are disclosed. The self-monitoring method of a display includes: inputting a first image test signal including a predetermined image test signal, in which the first image test signal includes playing signals of at least two frames of test image that are played in turn by switching; acquiring a display parameter of the predetermined image test signal; dividing at least two frames of image outputted into a plurality of areas, in which the areas include a predetermined area and a remaining area; acquiring a first display parameter of the predetermined area; determining whether or not an image displayed is matched with the first image test signal to acquire a first match result; and determining whether or not display abnormality presents in the display based on the first
(Continued)

100 match result. The method can determine whether or not display abnormality presents in the display.

22 Claims, 3 Drawing Sheets

Related U.S. Application Data continuation-in-part of application No. 16/472,964, filed as application No. PCT/CN2018/121277 on Dec. 14, 2018, now Pat. No. 11,462,139.

(52) U.S. Cl.
CPC ..... *G09G 2320/04* (2013.01); *G09G 2330/12* (2013.01); *G09G 2360/16* (2013.01)

(56) References Cited

U.S. PATENT DOCUMENTS

| | | | | |
|---|---|---|---|---|
| 11,727,837 | B2 * | 8/2023 | Wang | G09G 3/006<br>345/204 |
| 2002/0097395 | A1 | 7/2002 | Smith et al. | |
| 2008/0303766 | A1 | 12/2008 | Lee et al. | |
| 2011/0164110 | A1 | 7/2011 | Fortin et al. | |
| 2016/0125792 | A1 * | 5/2016 | Lee | G09G 3/006<br>345/212 |
| 2016/0247429 | A1 * | 8/2016 | Li | G01J 5/0066 |
| 2016/0259197 | A1 | 9/2016 | Huang et al. | |
| 2016/0267863 | A1 | 9/2016 | Zheng | |

FOREIGN PATENT DOCUMENTS

| | | | |
|---|---|---|---|
| CN | 206058821 | U | 3/2017 |
| CN | 106782251 | A | 5/2017 |
| CN | 108682367 | A | 10/2018 |

OTHER PUBLICATIONS

International Search Report and Written Opinion in corresponding International Patent Application No. PCT/CN2018/121277 dated Mar. 27, 2019 (an English translation attached hereto). 15 pages.

Non-Final Office Action for related U.S. Appl. No. 16/472,964, dated Feb. 10, 2022.

Notice of Allowance for related U.S. Appl. No. 16/472,964, dated May 25, 2022.

Notice of Allowance for related U.S. Appl. No. 17/813,970, dated Mar. 28, 2023.

* cited by examiner

SELF-MONITORING METHOD OF DISPLAY AND DISPLAY

CROSS REFERENCE TO RELATED APPLICATIONS

This application is a continuation of U.S. patent application Ser. No. 17/813,970 filed on Jul. 21, 2022, which is a continuation in part of U.S. patent application Ser. No. 16/472,964 filed on Jun. 24, 2019, which is a U.S. National Phase Entry of International Application No. PCT/CN2018/121277 filed on Dec. 14, 2018, which claims priority to and the benefit of Chinese patent application No. 201810387205.8 filed on Apr. 26, 2018. The above-identified applications are incorporated by reference herein in their entirety.

TECHNICAL FIELD

Embodiments of the present disclosure relate to a self-monitoring method of a display and a display employing the same.

BACKGROUND

With the development of the Internet of Things technology, display products are widely used, for example, digital signage is used for displaying advertisement in buildings, displaying traffic information on streets, etc, and monitor products are widely used in radio and television monitoring. These display products are also becoming more and more networked and intelligentized.

However, when display content is abnormal (for example, the display image is tampered with; the display image is not updated; and the display color is abnormal), a staff often cannot find the digital signage display with display abnormality in time, and therefore effectively monitoring of the play content cannot be realized. Monitoring by manpower can lead to an increase in labor costs.

SUMMARY

At least one embodiment of the present disclosure provides a self-monitoring method of a display, which comprises: inputting a first image test signal; acquiring a display parameter of the first image test signal; acquiring a first display parameter of at least one frame of image outputted, based on the first image test signal, by the display, wherein each frame of image of the at least one frame of image corresponds to a corresponding first display parameter; comparing the display parameter of the first image test signal with the first display parameter, determining whether or not an image displayed by the display is matched with the first image test signal so as to acquire a first match result; and determining whether or not display abnormality presents in the display based on the first match result.

For example, in the self-monitoring method of the display provided by at least one embodiment of the present disclosure, acquiring of the first display parameter of the at least one frame of image outputted, based on the first image test signal, by the display comprises: acquiring the first display parameters of at least two frames of image outputted, based on the first image test signal, by the display.

For example, in the self-monitoring method of the display provided by at least one embodiment of the present disclosure, comparing of the display parameter of the first image test signal with the first display parameter and determining whether or not the image displayed by the display is matched with the first image test signal comprises: comparing at least two first display parameters corresponding to the at least two frames of image so as to acquire a comparison result; determining a variation value between the at least two first display parameters according to the comparison result; and determining whether or not a change of the images displayed by the display is matched with the first image test signal according to the display parameter of the first image test signal and the variation value between the at least two first display parameters.

For example, in the self-monitoring method of the display provided by at least one embodiment of the present disclosure, the first image test signal comprises playing signals of the at least two frames of image, and a pre-determined variation value exists between at least two display parameters corresponding to the playing signals of the at least two frames of image. Determining of whether or not the change of the images displayed by the display is matched with the first image test signal according to the display parameter of the first image test signal and the variation value between the at least two first display parameters comprises: comparing the variation value between the at least two first display parameters with the pre-determined variation value; determining whether or not the variation value between the at least two first display parameters is matched with the pre-determined variation value so as to acquire a second match result; and determining whether or not the change of the images displayed by the display is matched with the first image test signal based on the second match result.

For example, the self-monitoring method of the display provided by at least one embodiment of the present disclosure, further comprises: respectively dividing the at least two frames of image outputted based on the first image test signal into a plurality of areas. Acquiring of the first display parameters of the at least two frames of image outputted, based on the first image test signal, by the display comprises: acquiring a first display parameter of each area of the plurality of areas of each frame of image of the at least two frames of image. Comparing of the display parameter of the first image test signal with the first display parameter and determining whether or not the image displayed by the display is matched with the first image test signal comprises: allowing a plurality of areas in one of the at least two frames of image to correspond to a plurality of areas in another one of the at least two frames of image according to positions of the plurality of areas of the at least two frames of image; and comparing the display parameter of the first image test signal with first display parameters of a plurality of corresponding areas of the at least two frames of image, and determining whether or not the images displayed by the display are matched with the first image test signal.

For example, in the self-monitoring method of the display provided by at least one embodiment of the present disclosure, comparing of the display parameter of the first image test signal with the first display parameters of the plurality of corresponding areas and determining whether or not the images displayed by the display are matched with the first image test signal comprises: respectively comparing first display parameters of each corresponding area; determining a variation value between the first display parameters of the each corresponding area according to the comparison result; and respectively determining whether or not an image displayed by the each corresponding area is matched with the first image test signal according to the display parameter of the first image test signal and variation values between the first display parameters of the plurality of corresponding areas of the at least two frames of image.

For example, in the self-monitoring method of the display provided by at least one embodiment of the present disclosure, the first image test signal comprises playing signals of at least two frames of image, and a pre-determined variation value exists between at least two display parameters corresponding to the playing signals of the at least two frames of image. Respectively determining of whether or not the image displayed by the each corresponding area is matched with the first image test signal according to the display parameter of the first image test signal and the variation values between the first display parameters of the plurality of corresponding areas comprises: comparing the variation value between the first display parameters of the each corresponding area with the pre-determined variation value; determining whether or not the variation value between the first display parameters of the each corresponding area is matched with the pre-determined variation value so as to acquire a third match result; and determining whether or not a change of the images displayed by the display is matched with the first image test signal according to the third match result.

For example, in the self-monitoring method of the display provided by at least one embodiment of the present disclosure, comparing of the display parameter of the first image test signal with the first display parameters of the plurality of corresponding areas and determining whether or not the images displayed by the display are matched with the first image test signal further comprises: determining a ratio, which is taken as an area ratio, of corresponding areas, which is not matched with the first image test signal, in the plurality of corresponding areas of the at least two frames of image to all the corresponding areas; and determining whether or not the images displayed by the display are matched with the first image test signal according to the area ratio. It is determined that the images displayed by the display are matched with the first image test signal when the area ratio is less than or equal to an area ratio threshold; and it is determined that the images displayed by the display are unmatched with the first image test signal when the area ratio is greater than the area ratio threshold.

For example, in the self-monitoring method of the display provided by at least one embodiment of the present disclosure, acquiring of the first display parameter of the at least one frame of image outputted, based on the first image test signal, by the display comprises: acquiring a first display parameter of one frame of first image outputted, based on the first image test signal, by the display; acquiring of the first display parameter of the one frame of first image outputted, based on the first image test signal, by the display comprises: dividing the first image into N first areas and respectively acquiring N first display parameters corresponding to the N first areas, wherein N is a positive integer greater than or equal to two; the first image test signal comprises a playing signal of one frame of second image; acquiring of the display parameter of the first image test signal comprises: dividing the second image into N second areas and respectively acquiring N comparison display parameters corresponding to the N second areas; and comparing of the display parameter of the first image test signal with the first display parameter and determining whether or not the image displayed by the display is matched with the first image test signal comprises: respectively comparing the N first display parameters corresponding to the N first areas with the N comparison display parameters corresponding to the N second areas and determining whether or not each of the N first areas is matched with a corresponding second area; acquiring an area ratio by calculating a ratio of a number of first areas, which is unmatched with corresponding second areas, in the N first areas to N; and determining that the image displayed by the display is matched with the first image test signal when the area ratio is less than or equal to an area ratio threshold, and determining that the image displayed by the display is unmatched with the first image test signal when the area ratio is greater than the area ratio threshold.

For example, in the self-monitoring method of the display provided by at least one embodiment of the present disclosure, acquiring of the first display parameter of the at least one frame of image outputted, based on the first image test signal, by the display comprises: extracting the first display parameter from a timing controller of the display, or extracting the first display parameter from a display processor of the display.

For example, in the self-monitoring method of the display provided by at least one embodiment of the present disclosure, acquiring of the first display parameter of the at least one frame of image outputted, based on the first image test signal, by the display comprises: extracting the first display parameter from the timing controller through a microcontroller unit of the display; or extracting the first display parameter from the display processor through a microcontroller unit of the display processor.

For example, in the self-monitoring method of the display provided by at least one embodiment of the present disclosure, the first display parameter comprises at least one of a brightness function value or a chromatic value of the at least one frame of image outputted based on the first image test signal.

For example, in the self-monitoring method of the display provided by at least one embodiment of the present disclosure, the display is in signal connection with a server; and the method further comprises: generating abnormality identification information when it is determined that the display abnormality presents in the display; and feeding back the abnormality identification information to the server.

At least one embodiment of the present disclosure provides a display, which comprises: a calculation apparatus and a processing controller. The calculation apparatus is connected with the processing controller; the display further comprises a microprocessor connected with the processing controller, or the processing controller comprises a microprocessor; the calculation apparatus is configured to input a first image test signal into the processing controller; the processing controller is configured to output at least one frame of image based on the first image test signal. The microprocessor is configured to: acquire a display parameter of the first image test signal and a first display parameter of the at least one frame of image; compare the display parameter of the first image test signal with the first display parameter, determine whether or not an image displayed by the display is matched with the first image test signal so as to acquire a first match result; and determine whether or not display abnormality presents in the display based on the first match result, wherein each frame of image of the at least one frame of image corresponds to a corresponding first display parameter.

For example, in the display provided by at least one embodiment of the present disclosure, acquiring of the first display parameter of the at least one frame of image outputted, based on the first image test signal, by the display comprises: acquiring first display parameters of at least two frames of image outputted based on the first image test signal.

For example, in the display provided by at least one embodiment of the present disclosure, the processing controller comprises a timing controller or a display processor. Acquiring of the first display parameters of the at least two frames of image outputted, based on the first image test signal, by the display comprises: extracting the first display parameters from the timing controller of the display, or extracting the first display parameters from the display processor of the display.

For example, in the display provided by at least one embodiment of the present disclosure, the processing controller comprises a timing controller and a display processor. When the display further comprises a microprocessor connected with the processing controller, the microprocessor is connected with the timing controller, and the microprocessor comprises a microcontroller unit. Acquiring of the first display parameters of the at least two frames of image outputted, based on the first image test signal, by the display comprises: extracting the first display parameter from the timing controller of the display by utilization of the microcontroller unit.

For example, in the display provided by at least one embodiment of the present disclosure, the processing controller comprises a timing controller and a display processor. When the processing controller comprises the microprocessor, the display processor comprises the microprocessor, and the microprocessor comprises a microcontroller unit. Acquiring of the first display parameters of the at least two frames of image outputted, based on the first image test signal, by the display comprises: extracting the first display parameter from the display processor by utilization of the microcontroller unit.

For example, in the display provided by at least one embodiment of the present disclosure, the first display parameter comprises at least one of a brightness function value or a chromatic value of the at least one frame of image outputted based on the first image test signal.

For example, in the display provided by at least one embodiment of the present disclosure, the display is in signal connection with a server. The microprocessor is further configured to: send abnormality identification information when it is determined that display abnormality presents in the display. The calculation apparatus is further configured to: receive the abnormality identification information from the microprocessor; and feed back the abnormality identification information to the server.

At least one embodiment of the present disclosure provides another self-monitoring method of a display, which comprises: inputting a first image test signal, wherein the first image test signal comprises playing signals of at least two frames of test image, and the playing signals of the at least two frames of test image are different; acquiring first display parameters of at least two frames of image outputted, based on the first image test signal, by the display, wherein each frame of image of the at least two frames of image corresponds to a corresponding first display parameter; comparing the first display parameters of the at least two frames of image so as to acquire a parameter comparison result; and determining whether or not display abnormality presents in the display according to the parameter comparison result.

For example, in another self-monitoring method of the display provided by at least one embodiment of the present disclosure, acquiring of the first display parameters of the at least two frames of image outputted, based on the first image test signal, by the display comprises: outputting a first output image and a second output image based on the first image test signal; dividing the first output image into N first output areas and respectively acquiring N first display parameters corresponding to the N first output areas, wherein N is a positive integer greater than or equal to two; and dividing the second output image into N second output areas and respectively acquiring N first display parameters corresponding to the N second output areas.

For example, in another self-monitoring method of the display provided by at least one embodiment of the present disclosure, comparing of the first display parameters of the at least two frames of image so as to acquire the parameter comparison result comprises: respectively comparing the N first display parameters corresponding to the N first output areas with the N first display parameters corresponding to the N second output areas, determining whether or not each of the N first output areas is matched with a corresponding second output area so as to acquire a parameter comparison result. Determining of whether or not the display abnormality presents in the display according to the parameter comparison result comprises: acquiring an area ratio by calculating a ratio of a number of first output areas, which is unmatched with corresponding second output areas, in the N first output areas to N; and determining that the image displayed by the display is matched with the first image test signal and the display abnormality does not present in the display when the area ratio is less than or equal to an area ratio threshold, and determining that the image displayed by the display is unmatched with the first image test signal and the display abnormality presents in the display when the area ratio is greater than the area ratio threshold.

BRIEF DESCRIPTION OF THE DRAWINGS

In order to clearly illustrate the technical solution of the embodiments of the disclosure, the drawings used in the description of the embodiments or relevant technologies will be briefly described in the following; it is obvious that the described drawings are only related to some embodiments of the disclosure and thus are not limitative of the disclosure.

DETAILED DESCRIPTION

Figure 1:
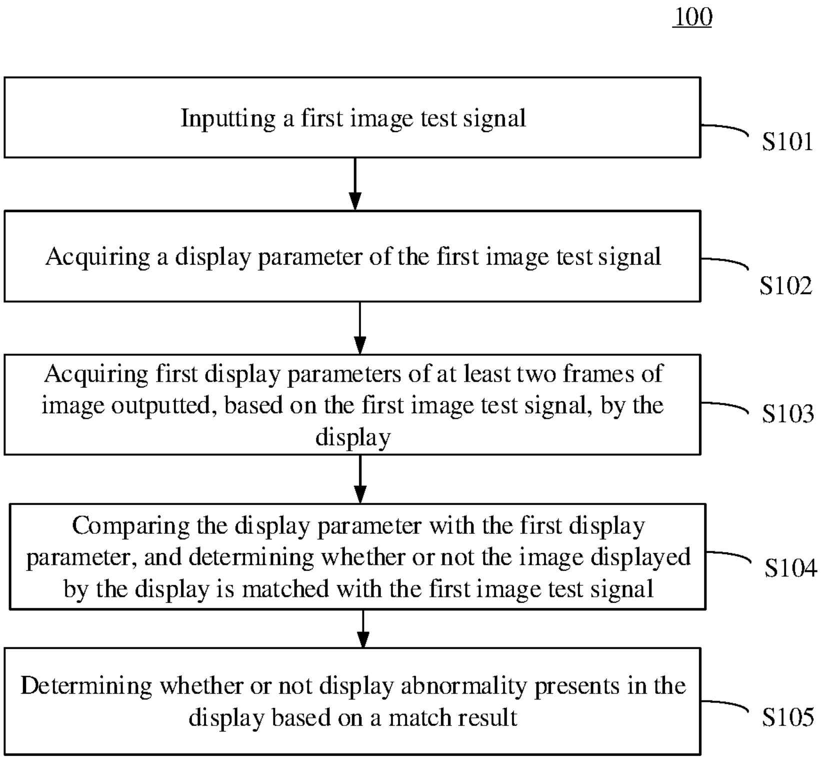
FIG. 1 is a flowchart of a self-monitoring method of a display provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The embodiments of the present disclosure will be described below in detail with reference to the accompanying drawings. It should be noted that in the present description and the drawings, substantially same steps and elements are represented by the same reference numerals, and the repeated explanation of these steps and elements will be omitted.

For example, in the embodiment of the present disclosure, the display includes a digital signal display, for example, the display includes a digital signal liquid crystal display (LCD); and for another example, the display includes: an advertising machine, an interactive display all-in-one machine, a monitor, a self-service machine, an industrial controlling computer, a cloud terminal, a building display, an indoor advertisement display, a traffic display, a public display, etc., in the field of digital signage display.

Embodiments of the present disclosure provide a self-monitoring method of a display and a display. In some embodiments of the present disclosure, the self-monitoring method of the display and the display can automatically monitor whether or not display abnormality presents in the display (for example, whether or not the display image is tampered with, whether or not the display image is normally updated, whether or not the display image color meets a standard), and therefore not only the display with display abnormality can be found in time but also labor costs can be reduced.

In some embodiments, the self-monitoring method of the display comprises: inputting a first image test signal; acquiring a display parameter of the first image test signal; acquiring first display parameters of at least two frames of image outputted, based on the first image test signal, by the display; comparing the display parameter of the first image test signal with the first display parameters, determining whether or not an image displayed by the display is matched with the first image test signal, and determining whether or not display abnormality presents in the display based on a match result. Each frame of image corresponds to one of the first display parameters.

In some embodiments of the present disclosure, the first image test signal includes a plurality of pieces of information, such as red, green, blue, black, white and other pure color pictures. For example, the first image test signal may be a video image (refer to the following description for details). The video image may be dynamically changed according to preset information. For example, the video image is a signal that is played in turn with pure color pictures such as red, green, blue, black and white at a certain time interval, so that the video image has playing signals of a plurality of frames of test image.

In some embodiments of the present disclosure, the display parameter of the first image test signal is a parameter standard value (which may be simply referred to as a standard value). For example, the display parameter of the first image test signal includes a color standard value of the image, and the color standard value may be the display parameter with different chromaticity corresponding to primary colors such as red, green and blue and generated in a standard color gamut.

In some embodiments of the present disclosure, whether or not the image displayed by the display is matched with the first image test signal refers to whether or not the image displayed by the display meets a display standard of the display or a color display standard. For example, the fact that the image displayed by the display is matched with the first image test signal refers to the image displayed by the display meets a display standard of the display or a color display standard. For example, the fact that the image displayed by the display is unmatched with the first image test signal refers to the image displayed by the display does not meet a display standard of the display or a color display standard.

For example, acquiring of the first display parameter of the at least one frame of image outputted, based on the first image test signal, by the display includes: acquiring first display parameters of at least two frames of image outputted based on the first image test signal. It should be noted that exemplary description is given to the present disclosure by taking the case that the first display parameter of the at least one frame of image outputted, based on the first image test signal, by the display includes the first display parameters of the at least two frames of image outputted based on the first image test signal, but the embodiment of the present disclosure is not limited thereto. For example, acquiring of the first display parameter of the at least one frame of image outputted based on the first image test signal further includes: acquiring first display parameters of one frame of image or three frames of image outputted based on the first image test signal.

In some other embodiments, the self-monitoring method of the display comprises: inputting a first image test signal, in which the first image test signal includes playing signals of at least two frames of test image, and the playing signals of the at least two frames of test image are different; acquiring first display parameters of at least two frames of image outputted, based on the first image test signal, by the display, in which each frame of image in the at least two frames of image corresponds to one of the first display parameters; comparing the first display parameters of the at least two frames of image so as to acquire a parameter comparison result; and determining whether or not display abnormality presents in the display according to the parameter comparison result.

For example, each of the at least two frames of test image of the first image test signal may be a test picture with a pure color such as red, green, blue, black, or white.

In some embodiments, the self-monitoring method includes: inputting a first image test signal; acquiring a first display parameter of at least one frame of image outputted, based on the first image test signal, by the display, in which each of the at least one frame of image corresponds to a first display parameter; comparing the first display parameter with a display parameter of the first image test signal, and acquiring a difference value between the first display parameter and the display parameter of the first image test signal;

and determining whether or not display abnormality presents in the display based on the difference value.

Figure 2:
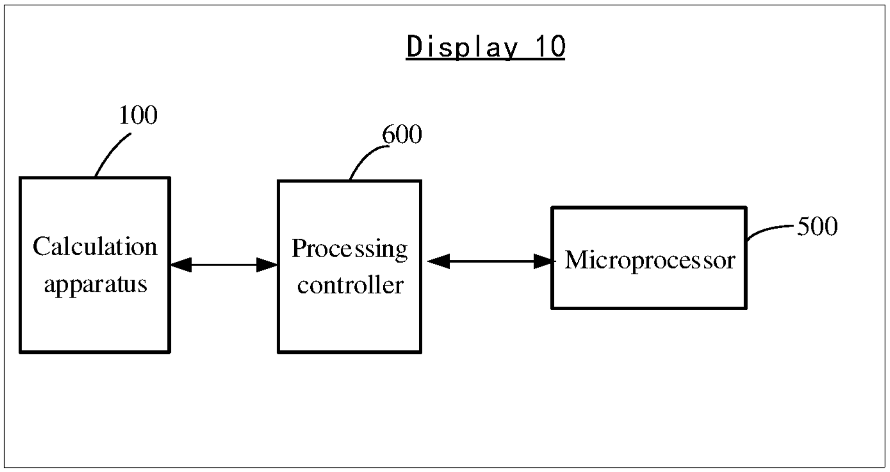
FIG. 2 is a schematic structural view of a display provided by an embodiment of the present disclosure.
Figure 4:
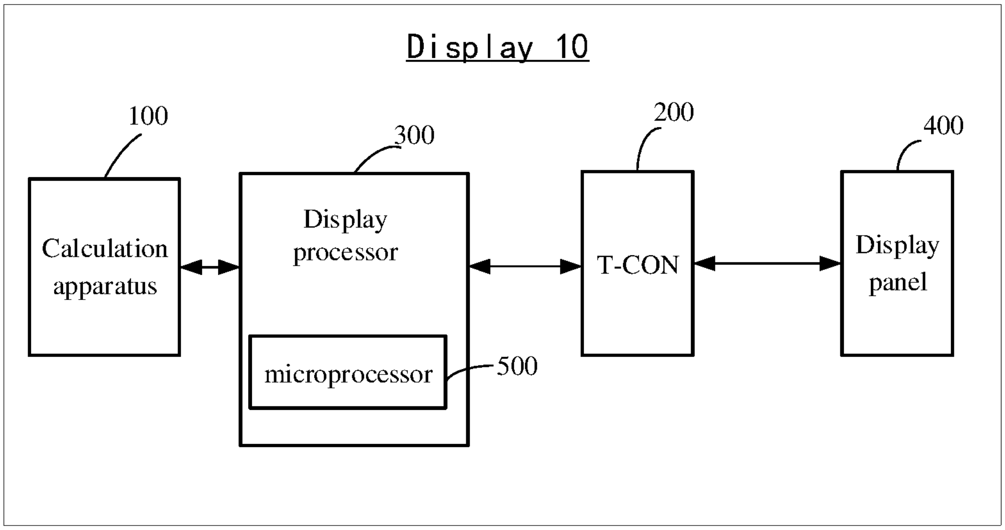
FIG. 4 is another schematic structural view of a display provided by an embodiment of the present disclosure.

FIG. 2 is a schematic structural view of a display employing the self-monitoring method of the display provided by an embodiment of the present disclosure. As illustrated in FIG. 2, the display 10 comprises a calculation apparatus 100 and a processing controller 600. The calculation apparatus 100 is connected with the processing controller 600. For example, the display 10 may further comprise a microprocessor 500. In this case, the processing controller 600 is also connected with the microprocessor 500. For another example, the processing controller 600 may include a microprocessor 500 (as illustrated in FIG. 4). The calculation apparatus 100 is configured to input a first image test signal into the processing controller 600. The processing controller 600 is configured to output at least one frame of image (for example, outputting at least two frames of image) based on the inputted first image test signal. The microprocessor 500 is configured to acquire first display parameters of the at least two frames of image, determine whether or not the images displayed by the display are matched with the first image test signal based on the first display parameters of the at least two frames of image, and determine whether or not display abnormality presents in the display based on the match result, in which each frame of image corresponds to one of the first display parameters.

For example, the fact that the image displayed by the display is matched with the first image test signal refers to the image displayed by the display meets a display standard of the display or a color display standard. For example, the fact that the image displayed by the display is unmatched with the first image test signal refers to the image displayed by the display does not meet a display standard of the display or a color display standard, which is regarded as display abnormality of the display.

Figure 3:
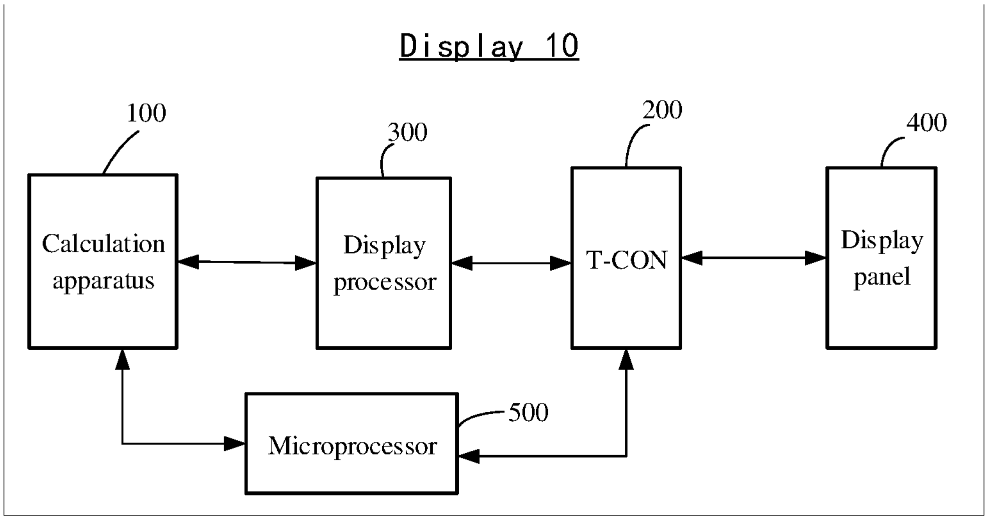
FIG. 3 is another schematic structural view of a display provided by an embodiment of the present disclosure.

FIG. 3 is a second schematic structural view of a display employing the self-monitoring method of the display provided by an embodiment of the present disclosure. As illustrated in FIG. 3, the display 10 comprises a calculation apparatus 100, a timing controller (T-CON) 200, a display processor 300, a display panel 400 and a microprocessor 500. As illustrated in FIG. 3, in the process of extracting the first display parameter from the T-CON of the display, the microprocessor 500 of the display 10 may be adopted to extract the first display parameter. In addition, according to an example of the present disclosure, the microprocessor 500 may also not disposed in the display but be connected with relevant components in the display.

FIG. 4 is a third schematic structural view of a display employing the self-monitoring method of the display provided by an embodiment of the present disclosure. As illustrated in FIG. 4, as similar to the display as illustrated in FIG. 3, the display as illustrated in FIG. 4 also comprises a calculation apparatus 100, a T-CON 200, a display processor 300, a display panel 400 and a microprocessor 500. The difference is that the microprocessor 500 is disposed in the display processor 300 and configured to extract the first display parameter from the display processor 300.

In the above example, the microprocessor 500, for example, may include an MCU (microcontroller unit).

In the example as illustrated in FIG. 4, in the processor of extracting the first display parameter from the display processor 300 (namely a system on a chip (SOC) terminal), the microprocessor 500 in the display processor 300 may be adopted to extract the first display parameter of the image signal outputted by the display processor 300.

According to other examples of the present disclosure, for example, the first display parameter may be extracted from the T-CON by the microprocessor 500 at the outside of the display processor 300. For another example, the microprocessor of the display processor 300 may also be utilized to extract the first display parameter or the microprocessor 500 in the display and at the outside of the display processor 300 may also be utilized to extract the first display parameter.

FIG. 1 is a flowchart of a self-monitoring method of a display provided by an embodiment of the present disclosure. As illustrated in FIG. 1, the self-monitoring method of the display may comprise the steps S101-S105.

S101: inputting a first image test signal. For example, a calculation apparatus of the display is adopted to input the first image test signal into a display processor in the display.

The first image test signal may be a static image test signal such as a picture (for example, it may be a test picture with a pure color such as red, green, blue, black, or white) and may also be a dynamic image test signal such as a video image. The video image may be dynamically changed according to preset information. For example, the video image is a signal that is played in turn with pure color pictures such as red, green, blue, black and white at a certain time interval, so that the video image has playing signals of a plurality of frames of test image.

The calculation apparatus is a computer having functions such as computing and processing, and, for example, the calculation apparatus may be a calculating board of the display. The calculating board, for example, may be a CPU (central processing unit)-based system. The operation system on which the calculation apparatus operates, for example, includes Android, Windows, linux, etc. Depending on the requirements of the product on computing power, the adopted CPU, for example, includes the CPU from manufacturers such as Intel, AMD, Rockchip and Hess. CPU models include, for example, Intel's Atom, core, pentium, celeron and other chips, AMD's A10, 4A/A6/A8, Athlon Mobile K6, turion and other chips, Rockchip's RK3188, RK3288, RK3368 and the like, Hess's HIV510, HIV530, etc.

In addition, the display processor is, for example, a component capable of processing and controlling an image or a video of the display. The display processor, for example, may include an SOC (system on a chip). After receiving the first image test signal, the display processor may process the first image test signal and then transmit the processed signal to a T-CON of the display.

FIG. 3 is a schematic structural view of a display provided by an embodiment of the present disclosure. As illustrated in FIG. 3, one end of a T-CON 200 is connected with a display processor 300 to receive data sent by the display processor 300, and the other end of the T-CON 200 is connected with a display panel 400 to synchronously process sequence signals required for control of the display panel 400 and output a control signal to drive the display panel 400 for display.

For example, before inputting the first image test signal, the play status of the display may be selected at first so as to allow the play status to be correspond to the input test image type. The play status, for example, includes standard mode, bright mode, dynamic mode, etc. The standard mode is generally selected. For example, in the process of determining whether or not the image displayed by the display is matched with the first image test signal, the selected play status of the display may be taken in to consideration.

For example, after selecting the play status of the display, a signal input channel, corresponding to the play status, for a calculation apparatus can be further selected, and then signals can be inputted into the selected signal input channel.

S102: acquiring a display parameter of the first image test signal.

The display parameter of the first image test signal is, for example, a brightness parameter of the image or a colorimetric parameter (chromatic parameter) of the image, e.g., the brightness average (the brightness average value) or the chromaticity average of the image, the brightness distribution value or the chromaticity distribution value, or a color parameter (such as a color coordinate) corresponding to the image display content in the standard color gamut, etc.

In some embodiments of the present disclosure, the first image test signal includes a plurality of pieces of information, such as red, green, blue, black, white and other pure color pictures.

In some embodiments, the display parameter of the first image test signal is a parameter standard value (which may be simply referred to as a standard value). For example, the display parameter of the first image test signal includes a color standard value of the image, and the color standard value may be the display parameter with different chromaticity corresponding to primary colors such as red, green and blue and generated in the standard color gamut.

For example, the brightness distribution value is an image matrix formed by the brightness values (or grayscales) of different image pixels, and each element in the image matrix represents the brightness value of one corresponding image pixel. For example, the brightness average may be the average value of all the elements in the image matrix, namely the ratio of the sum of all the elements of the image matrix to the number of elements of the image matrix. For example, the display parameter of the first image test signal may be acquired by the microprocessor 500 based on the first image test signal.

According to an example of the present disclosure, the first image test signal also includes playing signals of two frames or more frames of test image, and there is a pre-determined variation value between display parameters of the playing signals of the two frames or more frames of test image. For example, when a pre-determined variation value exists between display parameters of the playing signals of the two frames or more frames of test image, images of different colors are played in turn by switching, e.g., the video image is a signal that is played in turn with pure color pictures such as red, green, blue, black and white at a certain time interval.

S103: acquiring first display parameters of at least two frames of image outputted, based on the first image test signal, by the display.

For example, the at least two frames of image may include two continuous frames of image and may also be two discontinuous frames of image. In addition, the at least two frames of image include two frames of image or more frames (greater than two frames) of image. Each frame of image corresponds to one of the first display parameters. The first display parameter, for example, includes a brightness function value (for example, at least one of the brightness distribution value and the brightness average) of the at least two frames of image (for example, the image displayed by the display).

For example, the brightness function may also be referred to as a grayscale function, for example, including a columnar function. The brightness function value, for example, includes a columnar function value.

In addition, the first display parameter may further include the chromaticity parameter (for example, at least one of the chromaticity distribution value or the chromaticity average) of the image, for example, red, green and/or blue chromaticity parameter. According to an example of the present disclosure, the first display parameter (for example, the brightness distribution value, the brightness average or the columnar function value) may be extracted with respect to the entire image frame, or the first display parameter (the brightness distribution value, the brightness average or the columnar function value) may be extracted with respect to partial image areas of the entire image frame. In addition, the number of image areas, from which the first display parameter (for example, the brightness distribution value, the brightness average or the columnar function value) is extracted, the area of the areas and the coordinate values of the areas may also be preset, and then the first display parameter (for example, the brightness distribution value, the brightness average or the columnar function value) is extracted based on the preset parameters. For example, the intensity values of the brightness or the intensity values of the chromaticity of each image pixel in selected image areas are extracted with respect to the at least two frames of image. For another example, the brightness average or the chromaticity average of selected image areas is extracted with respect to the at least two frames of image.

For example, the chromaticity parameter of the image may also include a corresponding color parameter in the standard color gamut, such as a color coordinate which can be used as a color quantization standard. For example, the color coordinate of each image pixel in the selected image area can be extracted from the at least two frames of image.

In the embodiment of the present disclosure, the first display parameter may be extracted from the T-CON of the display, or the first display parameter may also be extracted from the display processor of the display, so as to detect whether or not the display content or the display function of the T-CON or the display processor is abnormal (for example, whether or not these device can provide a pre-determined signal of the display image). For example, due to the fact that the actual displayed content or display function may be different from the display standard of the display or the color display standard, it is necessary to detect whether or not the display content or the display function is abnormal FIG. 3 is a schematic structural view of the display provided by an embodiment of the present disclosure. As illustrated in FIG. 3, in the process of extracting the first display parameter from the T-CON of the display, the first display parameter may be extracted by the microprocessor of the display 10. In addition, according to an example of the present disclosure, the microprocessor may also not include a microprocessor disposed in the display and connected with a component of the display. For another example, the first display parameter may be acquired by a sensor and then transmitted to the microprocessor. Two terminals of the microprocessor 500 are respectively connected with the calculation apparatus 100 and the T-CON 200 to respectively acquire the display parameter of the first image test signal and the first display parameter (the first display parameter is extracted from the T-CON 200).

FIG. 4 is a third schematic structural view of the display provided by an embodiment of the present disclosure. As illustrated in FIG. 4, according to another example of the present disclosure, the microprocessor 500 may also be the microprocessor of the display processor 300. In the process of extracting the first display parameter from the display processor 200 (namely the SOC terminal), the microprocessor 500 in the display processor 300 may be adopted to extract the first display parameter of the image signal outputted by the display processor 300.

In the above embodiments, the microprocessor 500, for example, includes an MCU.

According to another example of the present disclosure, the microprocessor 500 at the outside of the display processor 300 may also be adopted to extract the first display parameter from the display processor 300. The microprocessor 500 at the outside of the display processor 300, for example, includes an MCU. The microprocessor 500 may be connected with the display processor 300, so as to extract the first display parameter of the image outputted by the display processor 300 (namely the SOC terminal).

In addition, according to an example of the embodiments of the present disclosure, the first display parameter may also be extracted by an integrated circuit (IC) of the display. In the example, the display includes an IC having the function of extracting the first display parameter, for example, the display includes an IC MST7425 on the T-CON terminal.

For another example, the first display parameter may also be extracted by an IC on the display processor (SOC) terminal, for example, AX66, AX6, C8, C9, etc.

According to an example of the present disclosure, for the extraction of the first display parameter, the first display parameter may be acquired from the display processor 300 through a sensor and transmitted to the microprocessor.

For another example, the first display parameter may be extracted through a designed software program. For example, a program for extracting the first display parameter of an image frame is designed. The program can acquire the grayscale distribution value or the chromaticity distribution value (including but not limited to the distribution values of red chroma R, green chroma G and blue chroma B) of the image from the stored image frame. For example, the first display parameter (for example, the grayscale average or the chromaticity average) of the image frame may be acquired according to the grayscale distribution value or the chromaticity distribution value of the image. For another example, the grayscale distribution or the color distribution of the image may also be calculated according to the brightness function or the color function to obtain the brightness function value or the color function value.

In addition, according to an example of the present disclosure, a second image test signal may also be inputted into the display before inputting the first image test signal into the display. The second image test signal is, for example, a monochromatic signal, e.g., an all-black signal, an all-white signal, an all-red signal, an all-green signal or an all-blue signal. After inputting the second image test signal, a second display parameter of the image outputted based on the second image test signal is extracted from the T-CON or the display processor of the display. The second display parameter is similar to the first display parameter and, for example, includes at least one of the brightness function value or the chromaticity function value of the image outputted based on the second image test signal. The brightness function value, for example, includes a columnar function value. The chromaticity value (the chromaticity function value), for example, includes a red chromatic value, a green chromatic value and a blue chromatic value.

The method of extracting the second display parameter is the same with the above method of extracting the first display parameter, so no further description will be given here. Subsequently, the second display parameter is compared with a display parameter (for example, the brightness distribution value, the brightness average, the chromaticity distribution value, the chromaticity average, or the color coordinate) of the second image test signal to acquire a comparison result, and then whether or not the second display parameter is within a preset range is determined according to the comparison result. For example, after inputting the all-white signal, whether or not the extracted brightness function value of the image outputted based on the all-white signal is matched with the brightness function value of the all-white signal (for example, whether or not it is the brightness function value of the all-white signal) is determined. Optionally, after inputting the all-white signal, the extracted color parameter (such as the color coordinate) of the image outputted based on the all-white signal and acquired by the sensor is compared with the color parameter of the all-white signal in the standard color gamut, and whether or not the color parameters are matched with each other is determined. For example, after inputting the all-black signal, whether or not the extracted brightness function value of the image is matched with the brightness function of the all-black signal (for example, whether or not it is the brightness function value of the all-black signal) is determined. Optionally, after inputting the all-black signal, the extracted color parameter (such as the color coordinate) of the image outputted based on the all-white signal and acquired by the sensor is compared with the color parameter of the all-black signal in the standard color gamut, and whether or not the color parameters are matched with each other is determined.

Thus, the boundary value of the parameter value can be obtained by determining the display parameter of an output signal under extremum conditions in advance. After the first display parameter is extracted, whether or not the extracted first display parameter is an effective value can be determined by determining whether or not the extracted first display parameter is within the set value range of the second display parameter, such that the test efficiency can be improved.

In embodiments of the present disclosure, the first display parameter may be extracted from the T-CON terminal or the display processor (SOC) terminal of the display, or extracted by adoption of software. Thus, no additional hardware cost is required, and then the cost can be reduced.

S104: comparing the display parameter of the first image test signal with the first display parameter, determining whether or not the image displayed by the display is matched with the first image test signal so as to acquire a first match result.

According to an example of the present disclosure, the acquired at least two first display parameters corresponding to the at least two frames of image can be compared to obtain a comparison result, and the variation value between two or more first display parameters is determined according to the comparison result. Whether or not the change of the image displayed by the display is matched with the first image test signal is determined based on the above variation value (for example, whether or not the above variation value is matched with the change of the display parameter of the first image test signal).

For example, the first match result can be acquired by the following method, and then whether or not display abnormality presents in the display can be determined. The variation value between the two first display parameters of the outputted two frames of image is compared with the display parameter of the inputted first image test signal. When the matching ratio of the two first display parameters and the display parameter is greater than or equal to a pre-determined threshold, it is determined that the outputted display image is matched with the inputted first image test signal (namely the first match result is that the outputted display image is matched with the inputted first image test signal), and display abnormality does not present in the display. When the matching ratio is less than the above pre-determined threshold, it is determined that the outputted display image is unmatched with the inputted first image test signal (namely the first match result is that the outputted display image is unmatched with the inputted first image test signal), and display abnormality presents in the display.

The variation value between the two first display parameters of the outputted two frames of image refers to a difference value between the two first display parameters of the outputted two frames of image.

The matching ratio, for example, may be the similarity between the variation value between the two first display parameters of the outputted two frames of image and the display parameter of the inputted first image test signal (for example, the variation value of the display parameters of the first image test signal). The matching ratio is high when the similarity is high, and is low when the similarity is low. If they are identical, the matching ratio is 100%. A matching ratio threshold can be set according to the user's settings. For example, the matching ratio can be set to be 80% or 95%. For example, the display parameter of the inputted first image test signal, for example, includes a brightness average, a brightness distribution value, etc.

According to another example of the present disclosure, the first image test signal also includes playing signals of two frames or more frames of test image, and there is a pre-determined variation value between display parameters of the playing signals of the two frames of test image or more frames of test image. For example, two frames of test image or more frames of test image with the pre-determined variation value may be selected in advance as the first image test signal. After extracting the variation value between the first display parameters of the at least two frames of image outputted based on the playing signals of the above two frames of image or more frames of test image, the variation value between the at least two first display parameters is compared with the above pre-determined variation value to determine whether or not the variation value between the first display parameters is matched with the pre-determined variation value so as to acquire a second match result, and whether or not the change of the image displayed by the display is matched with the first image test signal is determined according to the second match result.

For example, when the matching ratio of the variation value and the pre-determined variation value is equal to or greater than the matching ratio threshold (e.g., 90%), inputted and outputted signals can be considered as matched, namely the acquired second match result is that the variation value between the two first display parameters is matched with the pre-determined variation value, so it can be determined that the change of the image displayed by the display is matched with the first image test signal. When the matching ratio of the variation value and the pre-determined variation value is less than the matching ratio threshold (e.g., 90%), it is determined that an image outputted by an inputting domain is unmatched, that is, the acquired second match result is that the variation value between the two first display parameters is unmatched with the pre-determined variation value, and then it can be determined that the change of the image displayed by the display is unmatched with the first image test signal. For example, the matching ratio threshold may be set according to user demands. For example, when the user requires high matching ratio, the matching ratio threshold may be set to be 97-100%. When the user requires low matching ratio, the matching ratio threshold may be set to be 80%-96%.

In some embodiments, the first display parameter may be compared with the display parameter of the first image test signal, a difference value between the first display parameter and the display parameter of the first image test signal is acquired, and whether or not the image displayed by the display is matched with the first image test signal is determined according to the difference value. For example, when the difference value is less than a preset difference threshold, it is determined that the outputted display image is matched with the inputted first image test signal, and display abnormality does not present in the display. When the difference value is greater than or equal to a preset difference threshold, it is determined that the outputted display image is unmatched with the inputted first image test signal, and display abnormality presents in the display.

For example, when the first image test signal includes playing signals of two frames or more frames of test image, for example, when the first image test signal is played with red, green and blue pictures in a certain time delay or sequence, at least two first display parameters corresponding to at least two frames of image outputted based on the playing signals of the above two frames or more frames of test image are compared with the display parameters of the two frames or more frames of test image of the first image test signal respectively, and the difference value between each of the first display parameters and the corresponding display parameter of the first image test signal (for example, the display parameter of a corresponding one of the two frames or more frames of test image corresponding to the first image test signal) is acquired. When each difference value is less than a corresponding preset difference threshold, it is determined that the outputted display image is matched with the inputted first image test signal, and display abnormality does not present in the display. When the difference value between at least one of the first display parameters and the corresponding display parameter of the first image test signal, is greater than or equal to a corresponding preset difference threshold, it is determined that the outputted display image is unmatched with the inputted first image test signal, and display abnormality presents in the display. For example, each preset difference threshold may be the same as or different from each other, and it can be freely adjusted according to the actual situation, which will not be repeated here.

In addition, according to another example of the present disclosure, the outputted at least two frames of image may also be respectively divided into a plurality of areas, and then the first display parameters of the outputted at least two frames of image are acquired. For example, the number of divided areas may be preset, and the area of each area and the coordinate values of each area may be determined.

For example, taking the case that each frame of image is divided into four areas as an example, after each frame of image in the plurality of frames of image is divided into four areas, the first display parameter of each area in the four areas is acquired. For example, the image partitioning method of the plurality of frames of image is the same. For example, both the number of the divided areas and the size of each area are the same. Subsequently, one of the areas in one frame of image corresponds to one corresponding area of another frame (or the other frame) of image according to the positions of the plurality of areas. For example, when the first frame of image and the second frame of image are respectively divided into the following four areas: upper left area, lower left area, upper right area, and lower right, the upper left area of the first frame of image corresponds to the upper left area of the second frame of image; the upper right area of the first frame of image corresponds to the upper right area of the second frame of image; the lower left area of the first frame of image corresponds to the lower left area of the second frame of image; and the lower right area of the first frame of image corresponds to the lower right area of the second frame of image. After the areas correspond to each other, whether or not the image displayed by the display is matched with the first image test signal is determined according to the first display parameters of the plurality of corresponding areas of the at least two frames of image.

It should be noted that each corresponding area of the at least two frames of image includes an area disposed at the same position of each frame of image of the at least two frames of image. For example, when the first frame of image and the second frame of image are respectively divided into the following four areas: upper left area, lower left area, upper right area, and lower right area, the first corresponding area of the at least two frames of image includes the upper left area of the first frame of image and the upper left area of the second frame of image; the second corresponding area of the at least two frames of image includes the lower left area of the first frame of image and the lower left area of the second frame of image; the third corresponding area of the at least two frames of image includes the upper right area of the first frame of image and the upper right area of the second frame of image; and the fourth corresponding area of the at least two frames of image includes the lower right area of the first frame of image and the lower right area of the second frame of image.

For example, two first display parameters of each corresponding area of the two frames of image are respectively compared, and the variation value between the two first display parameters of the corresponding area of the two frames of image is determined according to the comparison result. For example, the variation values between the first display parameters of the corresponding four areas of the first frame of image and the second frame of image are respectively compared, and whether or not the image displayed by the display is matched with the first image test signal is determined according to the variation values of the first display parameters.

For example, when the first frame of image and the second frame of image are respectively divided into the following four areas: upper left area, lower left area, upper right area, and lower right area, the first display parameter of the upper left area of the first frame of image is compared with the first display parameter of the upper left area of the second frame of image; the first display parameter of the upper right area of the first frame of image is compared with the first display parameter of the upper right area of the second frame of image; the first display parameter of the lower left area of the first frame of image is compared with the first display parameter of the lower left area of the second frame of image; and the first display parameter of the lower right area of the first frame of image is compared with the first display parameter of the lower right area of the second frame of image. The variation values between the first display parameters is determined after comparison, and then whether or not the image displayed by the display is matched with the first image test signal is determined according to four variation values of the first display parameters.

For example, the four variation values of the first display parameters are respectively compared with the display parameter of the first image test signal, and the display parameter of the first image test signal, for example, may be the image brightness distribution value, the image brightness average, the chromaticity distribution value, the chromaticity average, or the color coordinate, etc. Subsequently, the matching ratio is determined according to the comparison result. For example, when the matching ratio of each corresponding area is greater than or equal to the pre-determined threshold, it is determined that the outputted display image is matched with the inputted first image test signal, that is, the first match result is that the image displayed by the display is matched with the first image test signal; and when the matching ratio of each area is less than the above pre-determined threshold, it is determined that the outputted display image is unmatched with the inputted first image test signal, that is, the first match result is that the image displayed by the display is unmatched with the first image test signal.

For another example, when the number of areas of which the matching ratio is greater than or equal to the pre-determined threshold is greater than an area number threshold (e.g., 3), it is determined that the outputted display image is matched with the inputted first image test signal, that is, the first match result is that the image displayed by the display is matched with the first image test signal; and when the number of areas of which the matching ratio is greater than or equal to the pre-determined threshold is less than the area number threshold, it is determined that the outputted display image is unmatched with the inputted first image test signal, that is, the first match result is that the image displayed by the display is unmatched with the first image test signal. For example, when the matching ratio of three areas in the four areas is greater than or equal to the pre-determined threshold, it is determined that the outputted display image is matched with the inputted first image test signal; and when the matching ratio of only two areas in the four areas is greater than or equal to the pre-determined threshold, it is determined that the outputted display image is unmatched with the inputted first image test signal.

For example, two frames of image or more frames of image with pre-determined variation value may also be selected in advance as the first image test signal. After extracting the variation values between first display parameters of corresponding areas of the outputted two frames of image or more frames of image, the variation values are compared with the above pre-determined variation value; whether or not variation value of each corresponding area is matched with the pre-determined variation value is determined, and a third match result is obtained; and whether or not the change of the image displayed by the display is matched with the first image test signal is determined based on the third match result. For example, each frame of image of the at least two frames of image of the first image test signal may be divided into a plurality of areas based on the method for dividing the areas of the at least two frames of image outputted based on the first image test signal, and the pre-determined variation value of each area is acquired; and in this case, the comparison between the variation value of each corresponding area and the pre-determined variation value indicates the comparison between the variation value of each corresponding area and the pre-determined variation value corresponding to the corresponding area.

For example, when the matching ratio of the variation value of each area and the pre-determined variation value is equal to or greater than the matching ratio threshold (e.g., 90%), it can be determined that the variation value of each area is matched with the pre-determined variation value (that is, the acquired third match result is matched), and then it can be determined that the outputted display image (for example, the image displayed by the display) is matched with the inputted first image test signal. When the matching ratio of the variation value of each area and the pre-determined variation value is less than the matching ratio threshold (e.g., 90%), it can be determined that the variation value of each area is unmatched with the pre-determined variation value (that is, the acquired third match result is unmatched), and then it can be determined that the inputted and outputted images are unmatched (for example, the image displayed by the display is unmatched with the inputted first image test signal).

According to another example of the present disclosure, in the embodiment where the at least two frames of image in the above output signal are respectively divided into the plurality of areas, the area ratio of corresponding areas, of which the variation value of the first display parameters is unmatched with the first image test signal, to all the divided areas may also be further determined. Whether or not the image displayed by the display is matched with the first image test signal is determined according to the area ratio. For example, when the area ratio is less than or equal to the area ratio threshold, it is determined that the image displayed by the display is matched with the first image test signal; and when the area ratio is greater than the area ratio threshold, it is determined that the image displayed by the display is unmatched with the first image test signal.

For example, the area ratio is the ratio of the number of corresponding areas which unmatched with the first image test signal, in the plurality of corresponding areas of the at least two frames of image to the number of the plurality of corresponding areas of the at least two frames of image.

For example, when each frame of image is divided into ten areas, when the variation value of first display parameters of two corresponding areas is unmatched with the first image test signal and the variation value of first display parameters of eight corresponding areas is matched with the first image test signal, the area ratio is 20%. If the area ratio threshold set by the user is 10%, as 20% is greater than the set area ratio 10%, it can be determined that the image displayed by the display is unmatched with the first image test signal.

For another example, when each frame of image is divided into ten areas, when the variation value of first display parameters of one corresponding area is unmatched with the first image test signal and the variation value of first display parameters of nine corresponding areas is matched with the first image test signal, the area ratio is 10%. If the area ratio threshold set by the user is 10%, the ratio of the current unmatched areas (namely the area ratio) is equal to the set area ratio, and then it can be determined that the image displayed by the display is matched with the first image test signal.

The above matching ratio, area ratio, pre-determined threshold, area ratio threshold and the like may all be set in accordance with user demands. For example, when the difference, between the outputted image and the inputted image signal, required by the user can be large, low matching ratio may be set; and when the difference, between the outputted image and the inputted image, required by the user cannot be too large, high matching ratio may be set.

In embodiments of the present disclosure, the image is divided into a plurality of areas for comparison, and therefore whether or not the image of each area is abnormal can be further determined accurately, and the change in the display content of partial areas is also monitored, which effectively avoids, for example, the case of tampering with the display content by inputting scrolling subtitles on the original display image.

S105: determining whether or not display abnormality presents in the display based on the first match result. According to an example of the present disclosure, when it is determined that the display image outputted by the display is unmatched with the inputted image (namely the image displayed by the display is unmatched with the first image test signal), it is determined that display abnormality presents in the display. When it is determined that the display image outputted by the display is matched with the inputted image (namely the image displayed by the display is matched with the first image test signal), it is determined that the display abnormality does not present in the display (the display abnormality does not present in the display).

For example, whether or not display abnormality presents in the display (for example, whether or not the display content is tampered with) may be determined by the following steps. Firstly, the first frame of image and the second frame of image in the first image test signal are respectively divided into four areas. Secondly, the four areas of the first frame of image are compared with the four areas of the second frame of image to acquire four pre-determined variation values of the first image test signal. Thirdly, each frame of image of the two frames of image outputted based on the first image test signal is respectively divided into four areas. Fourthly, four areas of image outputted based on the first frame of image in the first image test signal are compared with four areas of image outputted based on the second frame of image in the first image test signal to acquire four variation values of the two frames of image outputted based on the first image test signal. Fifthly, the four pre-determined variation values of the first image test signal are compared with the four variation values of the two frames of image outputted based on the first image test signal to determine the number of matched areas. Sixthly, whether or not the image displayed by the display is matched with the first image test signal is determined according to the number of the matched area (that is, acquiring the first match result). Finally, whether or not display abnormality presents in the display is determined based on the match result. For example, when the number of the matched areas is greater than or equal to the area number threshold, it is determined that the image displayed by the display is matched with the first image test signal and the display abnormality does not present in the display; and when the number of the matched areas is less than the area number threshold, it is determined that the image displayed by the display is unmatched with the first image test signal and display abnormality presents in the display.

In some embodiments of the present disclosure, the outputted at least two frames of image may also be respectively divided into a plurality of areas, for example, the plurality of areas include a predetermined area for correspondingly displaying a predetermined image test signal (i.e., a specific image test signal) and a remaining area excluding the predetermined area in each frame of image, and then at least two first display parameters of the predetermined area of the outputted at least two frames of image are acquired. For example, the predetermined image test signal may be at least a part of the first image test signal. For example, when the first image test signal is played with red, green and blue pictures in a certain time delay or sequence, the predetermined image test signal is a dynamic test signal in which the picture part of the corresponding area in each frame of test image of the first image test signal dynamically change in a preset sequence, and the first display parameter of the predetermined area of each frame of the outputted image is a parameter standard value (which may be simply referred to as a standard value). For example, the display parameter of the predetermined image test signal includes a color standard value of the predetermined area of the image, and the color standard value may be the display parameter with different chromaticity corresponding to primary colors such as red, green and blue and generated in a standard color gamut. For example, when the first image test signal is a static image test signal such as a red, green or blue pure color picture, the predetermined image test signal may be a picture part of a corresponding area in the first image test signal (for example, a picture part of a half area of the first image test signal). This is only an example, and is not a limitation of this disclosure.

For example, the area of the predetermined area, the area of the remaining area and the coordinate value of each area may be predetermined. For example, the predetermined area is located in the center of the image displayed by the display, and the remaining area surrounds the periphery of the predetermined area. For example, the plurality of areas are two areas. For example, the remaining area may also be divided into a plurality of sub-areas, which will not be described here.

For example, taking the case that each frame of image outputted is divided into two areas as an example, after each frame of image in the plurality of frames of the outputted image is divided into two areas, the first display parameters of the predetermined area (i.e., the area corresponding to a predetermined image test signal) in the two areas are acquired. Then, the first display parameter of the predetermined area is compared with the display parameter of the predetermined image test signal, and a difference value between the first display parameter of the predetermined area and the display parameter of the predetermined image test signal is acquired, in which the display parameter of the predetermined image test signal may be, for example, the image brightness distribution value, the image brightness average, the chromaticity distribution value, the chromaticity average, or the color coordinate, etc. It may be determined whether or not the image displayed by the display is with the predetermined image test signal according to the difference value. For example, when the difference value is less than a preset difference threshold, it is determined that the outputted display image is matched with the predetermined image test signal, that is, it is determined that the outputted display image is matched with the first image test signal, and display abnormality does not present in the display. When the difference value is greater than or equal to a preset difference threshold, it is determined that the outputted display image is unmatched with the predetermined image test signal, that is, it is determined that the outputted display image is unmatched with the first image test signal, and display abnormality presents in the display.

For example, when the first image test signal includes playing signals of two frames or more frames of test image, for example, when the first image test signal is played with red, green and blue pictures in a certain time delay or sequence, at least two first display parameters corresponding to the predetermined area of at least two frames of image outputted based on the playing signals of the above two frames or more frames of test image are compared with the display parameters of the predetermined image test signal respectively, and a first difference value between each of the first display parameters and the corresponding display parameter of the predetermined image test signal (for example, the display parameter of a corresponding one of two frames or more frames of test image corresponding to the predetermined image test signal) is acquired. When each first difference value is less than a corresponding first preset difference threshold, it is determined that the outputted display image is matched with the predetermined image test signal, that is, it is determined that the outputted display image is matched with the first image test signal, and display abnormality does not present in the display. When the first difference between at least one of the first display parameters corresponding to the predetermined area of the at least two frames of image outputted based on the playing signals of the two frames or more frames of test image and the corresponding display parameter of the predetermined image test signal is greater than or equal to a corresponding first preset difference threshold, it is determined that the outputted display image is unmatched with the predetermined image test signal, that is, it is determined that the outputted display image is unmatched with the first image test signal, and display abnormality presents in the display. For example, the above-mentioned first preset difference threshold may be set according to the requirements of users.

In some embodiments of the present disclosure, for the above-mentioned case of respectively dividing the outputted at least two frames of image into a predetermined area and a remaining area corresponding to a predetermined image test signal (i.e., a specific image test signal), the scheme of determining whether or not the change of the images displayed by the display is matched with the first image test signal may also be similarly adopted in the above-mentioned embodiment.

For example, at least two first display parameters corresponding to the outputted at least two frames of image are compared so as to acquire a comparison result, a variation value between the at least two first display parameters is determined according to the comparison result, and whether or not a change of the images displayed by the display is matched with the first image test signal is determined according to the display parameter of the predetermined image test signal and the variation value between the at least two first display parameters.

For example, when the first image test signal includes playing signals of the at least two frames of test image, a pre-determined variation value exists between at least two display parameters corresponding to at least two frames of image corresponding to the predetermined image test signal of the first image test signal. Then, the variation value between the at least two first display parameters is compared with the pre-determined variation value, whether or not the variation value between the at least two first display parameters is matched with the pre-determined variation value is determined so as to acquire a second match result; and whether or not the change of the images displayed by the display is matched with the first image test signal is determined based on the second match result.

For example, in some examples, the remaining area includes one or more sub-areas. Therefore, after acquiring the first display parameters of the one or more sub-areas of the remaining area of the outputted at least two frames of image, the display parameters of the first image test signal are compared with the first display parameters of the one or more sub-areas of the remaining area of the at least two frames of image respectively, and whether or not the image displayed by the display is matched with the first image test signal is determined. Each sub-area of the one or more sub-areas corresponds to a corresponding first display parameter.

For example, the first display parameters of the one or more sub-areas of the remaining area of the at least two frames of image are compared with the display parameters of the first image test signal, and a second difference value between each of the first display parameters of the one or more sub-areas of the remaining area of the at least two frames of image and the corresponding display parameter of the first image test signal is acquired; and then the second difference value is compared with a corresponding second preset difference threshold, and whether or not the image displayed by the display is matched with the first image test signal is determined. For example, the second preset difference threshold may be set according to the requirements of users.

It should be noted that, when the display parameters of the first image test signal are compared with the first display parameters of the one or more sub-areas of the remaining area of the at least two frames of image, and whether or not the image displayed by the display is matched with the first image test signal is determined, the above-mentioned scheme of determining whether or not the image displayed by the display is matched with the first image test signal according to the matching ratio, area ratio, pre-determined threshold and area ratio threshold may be similarly adopted in the case where the outputted at least two frames of image are respectively divided into a plurality of areas.

For example, in some examples, one or more sub-areas of the remaining area in one of the at least two frames of image is allowed to correspond to one or more sub-areas of the remaining area in another one of the at least two frames of image according to positions of the one or more sub-areas of the remaining area of the at least two frames of image respectively. The display parameters of the first image test signal are compared with the first display parameters of one or more corresponding sub-areas of the at least two frames of image, and whether or not the images displayed by the display are matched with the first image test signal is determined.

For example, first display parameters of each corresponding sub-area are respectively compared, and a variation value between the first display parameters of the each corresponding sub-area is determined according to the comparison result. Then whether or not an image displayed by the each corresponding sub-area is matched with the first image test signal is determined according to the display parameter of the first image test signal and variation values between the first display parameters of the one or more corresponding sub-areas of the at least two frames of image respectively. For example, the variation value of the each corresponding sub-area is compared with the pre-determined variation value, whether or not the variation value of the each corresponding sub-area is matched with the pre-determined variation value is determined so as to acquire a third match result, and whether or not a change of the images displayed by the display is matched with the first image test signal is determined according to the third match result.

For example, a ratio, which is taken as an area ratio, of corresponding sub-areas, which is not matched with the first image test signal, in the one or more corresponding sub-areas of the at least two frames of image to all the corresponding areas, is determined; and whether or not the images displayed by the display are matched with the first image test signal is determined according to the area ratio. It is determined that the images displayed by the display are matched with the first image test signal when the area ratio is less than or equal to an area ratio threshold, and it is determined that the images displayed by the display are unmatched with the first image test signal when the area ratio is greater than the area ratio threshold.

For example, the display (the microprocessor of the display) may feedback abnormality identification information to the calculation apparatus. For example, if the image is abnormal, the feedback identifier is A=1. If the image is normal, the feedback identifier is A=0. Thus, a test device (the staff sending test instructions) can know whether or not each display is abnormal. For example, the display may acquire the first display parameter of the image displayed by the display and the display parameter of the first image test signal, compare the first display parameter of the image displayed by the display with the display parameter of the first image test signal, and generate a corresponding analysis report (such as a comparison report or a test report). For example, the display (the microprocessor of the display) can upload the feedback of abnormality identification information to the server (e.g., the cloud server). For example, the staff that monitors the display can periodically check to see if there is an abnormal display. For another example, when the server receives the signal indicating display abnormality, the information of the abnormal display can be also pushed to (send to) the staff that monitors the display, thereby enabling the staff to know the display status of each display in time.

For example, in some examples, whether or not the change in the signal content is matched with the input signal (for example, whether or not the image displayed by the display is matched with the first image test signal) can be determined by extracting the first display parameters of the image frames from the display processor or the T-CON terminal and comparing the extracted first display parameters with the display parameter of the first image test signal, and whether or not display abnormality presents in the display can be determined based on the match result. In some other examples, the display can be communicated with the calculation apparatus to realize fault feedback, and therefore the self-monitoring of the display can be effectively realized and the operation and maintenance efficiency can be improved.

Therefore, the self-monitoring method of the display provided by an embodiment of the present disclosure can automatically monitor whether or not the display is abnormal (for example, whether or not the display image is tampered with, whether or not the display image is normally updated), and then not only display abnormality can be found in time but also labor costs can be reduced.

The embodiment of the present disclosure provides another self-monitoring method of a display. The self-monitoring method of the display comprises the following steps S210-S250:

S210: inputting a first image test signal;

S220: acquiring a display parameter of the first image test signal;

S230: acquiring a first display parameter of one frame of first image outputted, based on the first image test signal, by the display;

S240: comparing the display parameter of the first image test signal with the first display parameter, determining whether or not an image displayed by the display is matched with the first image test signal so as to acquire a first match result; and

S250: determining whether or not display abnormality presents in the display based on the first match result.

For example, in the step S210, the first image test signal may be a static image test signal such as a test picture with a pure color such as red, green, blue, black, or white. For example, the display parameter of the first image test signal is a parameter standard value (which may be simply referred to as a standard value). For example, the display parameter of the first image test signal includes a color standard value of the image, and the color standard value may be the display parameter with different chromaticity corresponding to primary colors such as red, green and blue and generated in a standard color gamut.

For example, in the step S240, whether or not the image displayed by the display is matched with the first image test signal refers to whether or not the image displayed by the display meets a display standard of the display or a color display standard.

For example, the step S230 includes: dividing the first image into N first areas and respectively acquiring N first display parameters corresponding to the N first areas, in which N is a positive integer greater than or equal to two.

For example, the first image test signal includes a playing signal of one frame of second image; and acquiring of the display parameter of the first image test signal includes: dividing the second image into N second areas and respectively acquiring N comparison display parameters corresponding to the N second areas.

For example, the step S240 includes the following steps S241-S243.

S241: determining whether or not each of the N first areas is matched with a corresponding second area by respectively comparing the N first display parameters corresponding to the N first areas with the N comparison display parameters corresponding to the N second areas.

S242: acquiring an area ratio by calculating the ratio of the number of first areas, that is unmatched with the corresponding second areas, in the N first areas to N.

S243: determining that the image displayed by the display is matched with the first image test signal when the area ratio is less than or equal to the area ratio threshold, and determining that the image displayed by the display is unmatched with the first image test signal when the area ratio is greater than the area ratio threshold.

For example, in the step S250, it is determined that display abnormality does not present in the display in the case of determining that the image displayed by the display is matched with the first image test signal; and it is determined that display abnormality presents in the display in the case of determining that the image displayed by the display is unmatched with the first image test signal.

For example, the self-monitoring method of the display provided by an embodiment of the present disclosure can automatically monitor whether or not the image displayed by the display is tampered with. For example, it can be determined that the image displayed by the display is not tampered with in the case of determining that the display abnormality does not present in the display; and it can be determined that the display of the display is tampered with in the case of determining that display abnormality presents in the display.

It should be noted that for clarity, in another self-monitoring method of the display provided by an embodiment of the present disclosure, only the differences from other self-monitoring methods of the display are described, and the similarities (for example, the first display parameter includes at least one of the brightness distribution value, the chromaticity distribution value, brightness average, chromaticity average or a color coordinate, the definition of the area ratio) may refer to other self-monitoring methods of the display provided by an embodiment of the present disclosure, so no further description will be given here.

The embodiment of the present disclosure provides another self-monitoring method of a display. The self-monitoring method of the display includes the following steps S510-S560.

S510: inputting a first image test signal;

S520: acquiring a display parameter of the first image test signal;

S530: acquiring a first display parameter of one frame of first image outputted, based on the first image test signal, by the display;

S540: comparing the display parameter of the first image test signal with the the first display parameter of the first image, and acquiring a difference value between the first display parameter and the display parameters of the first image test signal;

S550: comparing the difference value with a preset difference threshold, determining whether or not an image displayed by the display is matched with the first image test signal so as to acquire a fourth match result;

S560: determining whether or not display abnormality presents in the display based on the fourth match result.

For example, in the step S550, when the difference value between the first display parameter and the display parameters of the first image test signal is less than the preset difference threshold, it is determined that the outputted display image is matched with the inputted first image test signal, and display abnormality does not present in the display in the step S560.

For example, in the step S550, when the difference value between the first display parameter and the display parameters of the first image test signal is greater than or equal to the preset difference threshold, it is determined that the outputted display image is unmatched with the inputted first image test signal, and display abnormality presents in the display in the step S560.

The embodiment of the present disclosure provides another self-monitoring method of a display. The self-monitoring method of the display includes the following steps S610-S670.

S610: inputting a first image test signal, in which the first image test signal includes a predetermined image test signal;

S620: acquiring a display parameter of the predetermined image test signal of the first image test signal;

S630: dividing one frame of first image outputted, based on the first image test signal, by the display, into a plurality of areas, in which the plurality of areas of the first image include a predetermined area corresponding to the predetermined image test signal and a remaining area excluding the predetermined area in the first image;

S640: acquiring a first display parameter of the predetermined area of the first image;

S650: comparing the first display parameter of the predetermined area of the first image with the display parameter of the predetermined image test signal, and acquiring a third difference value between the first display parameter and the display parameter of the predetermined image test signal;

S660: comparing the third difference value with a third preset difference threshold, and determining whether or not the image displayed by the display is matched with the first image test signal so as to acquire a fifth match result;

S670: determining whether or not display abnormality presents in the display based on the fifth match result.

For example, in the step S660, when the third difference value between the first display parameter and the display parameter of the predetermined image test signal is less than the third preset difference threshold, it is determined that the outputted display image is matched with the predetermined image test signal, that is, it is determined that the outputted display image is matched with the first image test signal, and display abnormality does not present in the display in the step S670.

For example, in the step S660, when the third difference value between the first display parameter and the display parameter of the predetermined image test signal is greater than or equal to the third preset difference threshold, it is determined that the outputted display image is unmatched with the predetermined image test signal, that is, it is determined that the outputted display image is unmatched with the first image test signal, and display abnormality presents in the display in the step S670.

For example, the third preset difference threshold may be set according to the requirements of users.

It should be noted that, when one frame of the first image outputted based on the first image test signal of the present disclosure, the above-mentioned various embodiments that the remaining area in the plurality of areas may include one or more sub-areas can be similarly adopted.

For example, in some examples, the remaining area of the first image includes one or more sub-areas. Then after acquiring the first display parameters of the one or more sub-areas of the remaining area of the first image, the display parameter of the first image test signal is compared with the first display parameter of the one or more sub-areas of the remaining area of the first image, and whether or not the image displayed by the display is matched with the first image test signal is determined. Each of the one or more sub-areas of the remaining area corresponds to a corresponding first display parameter.

For example, the first display parameter of the one or more sub-areas of the remaining area of the first image is compared with the display parameter of the first image test signal, a fourth difference value between each of the first display parameter of the one or more sub-areas of the remaining area of the first image and the corresponding display parameter of the first image test signal is acquired, and the fourth difference value is compared with a corresponding fourth preset difference threshold, and whether or not the image displayed by the display is matched with the first image test signal is determined.

It should be noted that for clarity, in further still another self-monitoring method of the display provided by an embodiment of the present disclosure, only the differences from other self-monitoring methods of the display are described, the similarities may refer to other self-monitoring methods of the display provided by an embodiment of the present disclosure, so no further description will be given here.

The embodiment of the present disclosure provides still another self-monitoring method of a display. The self-monitoring method of the display comprises the following steps S310-S340.

S310: inputting a first image test signal, in which the first image test signal includes playing signals of at least two frames of test image, and the playing signals of the at least two frames of test image are different.

S320: acquiring first display parameters of at least two frames of image outputted, based on the first image test signal, by the display, in which each frame of image of the at least two frames of image corresponds to one of the first display parameters.

S330: comparing the first display parameters of the at least two frames of image so as to acquire a parameter comparison result.

S340: determining whether or not display abnormality presents in the display according to the parameter comparison result.

For example, the process of acquiring the first display parameters of the at least two frames of image outputted, based on the first image test signal, by the display in the step S320 includes the following steps S321-S323.

S321: outputting a first output image and a second output image based on the first image test signal.

S322: dividing the first output image into N first output areas and respectively acquiring N first display parameters corresponding to the N first output areas, in which N is a positive integer greater than or equal to two.

S323: dividing the second output image into N second output areas and respectively acquiring N first display parameters corresponding to the N second output areas.

For example, the process of comparing the first display parameters of the at least two frames of image and acquiring the parameter comparison result in the step S330 includes: respectively comparing the N first display parameters corresponding to the N first output areas with the N first display parameters corresponding to the N second areas, determining whether or not each of the N first output area is matched with a corresponding second output area so as to acquire the parameter comparison result. For example, determining of whether or not each of the N first output areas is matched with the corresponding second output area includes the following steps S331-S333.

S331: calculating the ratio of the brightness average of each output area in the N first output areas to the brightness average of the corresponding second output area so as to acquire the brightness matching degree of each output area (that is, the brightness matching degree of each first output area and the corresponding second output area).

S332: comparing the brightness matching degree of each output area with a brightness matching degree threshold, and determining a parameter comparison result of each output area. The above parameter comparison result of each output area includes: it is determined that the brightness of the output areas are matched (namely the brightness of the first output area is matched with the brightness of corresponding second output area) when the brightness matching degree of the output areas is greater than or equal to the brightness matching degree threshold; and it is determined that the brightness of the output areas are unmatched (namely the brightness of the first output area is unmatched with the brightness of the corresponding second output area) when the brightness matching degree of the output areas is less than the brightness matching degree threshold.

For example, the brightness matching degree threshold may be set to be 3%-20%. For example, the value of the brightness matching degree threshold may be adjusted according to the size of each output area. For example, in the case of increasing the size of each output area (namely reducing the number of the output areas), the value of the brightness matching degree threshold can be appropriately reduced.

For example, the process of determining whether or not display abnormality presents in the display according to the parameter comparison result in the step S340 includes the following steps S341 and S42.

- S341: acquiring the area ratio by calculating the ratio of the number of first output areas, that is unmatched with the corresponding second output areas, in the N first output areas to N.
- S342: determining that the image displayed by the display is matched with the first image test signal and the display abnormality does not present in the display when the area ratio is less than or equal to the area ratio threshold, and determining that the image displayed by the display is unmatched with the first image test signal and display abnormality presents in the display when the area ratio is greater than the area ratio threshold.

It should be noted that for clarity, in still another self-monitoring method of the display provided by an embodiment of the present disclosure, only the differences from other self-monitoring methods of the display are described, and the similarities (for example, the first display parameter includes at least one of the brightness distribution value, the chromaticity distribution value, or the color coordinate, the definition of the area ratio) may refer to other self-monitoring methods of the display provided by an embodiment of the present disclosure, so no further description will be given here.

For example, the still another self-monitoring method of the display provided by an embodiment of the present disclosure can automatically monitor whether or not the image displayed by the display can be refreshed normally. For example, it can be determined that the image displayed by the display can be normally updated in the case of determining that the display abnormality does not present in the display; and it can be determined that the image displayed by the display cannot be normally updated in the case of determining that display abnormality presents in the display.

It should be noted that for clarity, in further still another self-monitoring method of the display provided by an embodiment of the present disclosure, only the differences from other self-monitoring methods of the display are described, and the similarities (for example, the first display parameter includes at least one of the brightness distribution value or the chromaticity distribution value, the definition of the area ratio) may refer to other self-monitoring methods of the display provided by an embodiment of the present disclosure, so no further description will be given here.

For example, embodiments of the present disclosure provide further still another self-monitoring method of a display. The self-monitoring method of the display comprises the following steps S410-S430.

- S410: inputting an all-black test signal and acquiring a first display parameter of a frame of image outputted by the display based on the all-black test signal. For example, the first display parameter of the frame of image outputted based on the all-black test signal may be the brightness average or the chromaticity average of the frame of image outputted based on the all-black test signal.
- S420: inputting an all-white test signal and acquiring a first display parameter of a frame of image outputted by the display based on the all-white test signal. For example, the first display parameter of the frame of image outputted based on the all-white test signal may be the brightness average or the chromaticity average of the frame of image outputted based on the all-white test signal.
- S430: comparing the first display parameter of the frame of image outputted by the display based on the all-black test signal with the first display parameter of the frame of image outputted by the display based on the all-white test signal, and determining whether or not display abnormality presents in the display.

For example, the step S430 may include the following steps S431-S432.

- S431: calculating the ratio of the brightness average or the chromaticity average of the frame of image outputted based on the all-black test signal to the brightness average or the chromaticity average of the frame of image outputted based on the all-white test signal so as to acquire a first display parameter matching degree.
- S432: comparing the first display parameter matching degree with the first display parameter matching degree threshold so as to acquire a parameter comparison result. The above parameter comparison result includes: determining that the display is normal when the first display parameter matching degree is greater than or equal to the first display parameter matching degree threshold; and determining that the display is abnormal when the first display parameter matching degree is less than the first display parameter matching degree threshold. For example, the brightness matching degree threshold may be set to be 3%-20%.

It should be noted that according to actual application demands, another self-monitoring method of the display provided by an embodiment of the present disclosure may be combined with further still another self-monitoring method of the display provided by an embodiment of the present disclosure. For example, during the boot process (i.e., after booting and before normal operation) of the display, the further still another self-monitoring method of the display provided by an embodiment of the present disclosure may be adopted to determine whether or not display abnormality presents in the display. After the normal operation of the display, the another self-monitoring method of the display provided by an embodiment of the present disclosure may be adopted to determine whether or not display abnormality presents in the display.

The display self-detection method according to the embodiment of the present disclosure has been described above, and the display according to the embodiment of the present disclosure will be further described below. The display is the same as the above-described display employing the display self-detection method. For the brevity of the description, only simple description will be given below, and specific structures and functions refer to all the foregoing embodiments.

FIG. 2 is a schematic structural view of the display provided by an embodiment of the present disclosure. As illustrated in FIG. 2, the display 10 comprises a calculation apparatus 100, a processing controller 600 and a microprocessor 500. The calculation apparatus 100, the processing controller 600 and the microprocessor 500 are connected with each other. The calculation apparatus 100 is configured to input a first image test signal into the processing controller 600. The processing controller 600 is configured to output at least two frames of image based on the inputted first image test signal. The microprocessor 500 is configured to acquire a display parameter of the first image test signal and first display parameters of the at least two frames of image, compare the display parameter of the first image test signal with the first display parameters, determine whether or not the image displayed by the display is matched with the first image test signal so as to acquire a first match result, and determine whether or not display abnormality presents in the display based on the first match result, in which each frame of image corresponds to one of the first display parameters.

FIG. 3 is another schematic structural view of the display provided by an embodiment of the present disclosure. As illustrated in FIG. 3, the processing controller includes a T-CON 200 and/or a display processor 300. One end of the display processor 300 is connected with the calculation apparatus 100, and the other end is connected with the T-CON 200. One end of the T-CON 200 is connected with the display processor 300 and configured to receive data sent by the display processor 300, and the other end is connected with a display panel 400. The T-CON 200 can synchronously process sequence signals required for control of the display panel 400 and output a control signal to drive the display panel 400 for display. The microprocessor 500 not only can extract the first display parameter of the image from an output terminal of the display processor 300 but also can extract the first display parameter from an output terminal of the T-CON.

FIG. 4 is a third schematic structural view of the display provided by an embodiment of the present disclosure. As illustrated in FIG. 4, according to another example of the present disclosure, the microprocessor 500 may also be a microprocessor of the display processor 300. When the first display parameter is extracted from the display processor 200 (namely the SOC terminal), the microprocessor 500 in the display processor 300 may be adopted to extract the first display parameter of the image signal outputted by the display processor 300.

The microprocessor 500, for example, includes an MCU.

For example, determining of whether or not the image displayed by the display is matched with the first image test signal based on the first display parameter includes: comparing the first display parameters corresponding to the at least two frames of image; determining the variation value between the first display parameters according to the comparison result; and determining whether or not the change of the image displayed by the display is matched with the first image test signal according to the display parameter of the first image test signal and the variation value.

For example, the first image test signal includes playing signals of two frames of image; there is a pre-determined variation value between display parameters of the playing signals of the two frames of image; and determining of whether or not the change of the image displayed by the display is matched with the first image test signal based on the variation value includes: comparing the variation value with a pre-determined variation value; determining whether or not the variation value is matched with the pre-determined variation value so as to acquire a second match result; and determining whether or not the change of the image displayed by the display is matched with the first image test signal based on the second match result.

For example, the microprocessor is further configured to respectively divide the outputted at least two frames of image into a plurality of areas; and acquiring of the first display parameters of the at least two frames of image outputted, based on the first image test signal, by the display includes: acquiring a first display parameter of each area of the plurality of areas of the at least two frames of image; and determining of whether or not the image displayed by the display is matched with the first image test signal according to the display parameter of the first image test signal and the first display parameters includes: allowing one of the areas in one frame of image to correspond to one of the areas of another (the other) frame according to the positions of the plurality of areas; and determining whether or not the image displayed by the display is matched with the first image test signal according to the display parameter of the first image test signal and the first display parameters of the plurality of corresponding areas.

For example, determining of whether or not the image displayed by the display is matched with the first image test signal according to the first display parameters of the plurality of corresponding areas includes: respectively comparing the first display parameters of each corresponding area; determining the first display parameter variation value of the corresponding area based on the comparison result; and determining whether or not the display image of the corresponding area is matched with the first image test signal according to the display parameter of the first image test signal and the first display parameter variation value of the corresponding area.

For example, the first image test signal includes playing signals of two frames of image; there is a pre-determined variation value between display parameters of the playing signals of the two frames of image; and determining of whether or not the display image of the corresponding area is matched with the first image test signal according to the display parameter of the first image test signal and the first display parameter variation value of the corresponding area includes: comparing the variation value of each corresponding area with the pre-determined variation value; determining whether or not the variation value of each area is matched with the pre-determined variation value so as to acquire a third match result; and determining whether or not the change of the image displayed by the display is matched with the first image test signal based on the third match result.

For example, determining of whether or not the image displayed by the display is matched with the first image test signal according to the first display parameters of the plurality of corresponding areas further includes: determining the ratio, which is taken as an area ratio, of corresponding areas, where the display image is matched with the first image test signal, to all the corresponding areas; and determining whether or not the image displayed by the display is matched with the first image test signal according to the area ratio.

For example, the calculation apparatus is further configured to: input a second image test signal into the display; and the microprocessor is further configured to: extract a second display parameter of an image displayed by the display based on the second image test signal; compare the second display parameter with the second image test signal; and determine whether or not the second display parameter is within a pre-determined range based on the comparison result.

For example, the processing controller includes a T-CON; and acquiring of the first display parameters of the at least two frames of image outputted, based on the first image test signal, by the display includes: extracting the first display parameter from the T-CON of the display.

For example, the microprocessor includes an MCU; and acquiring of the first display parameters of the at least two frames of image outputted, based on the first image test signal, by the display includes: extracting the first display parameter from the T-CON of the display by utilization of the MCU.

For example, the processing controller includes a display processor; and acquiring of the first display parameters of the at least two frames of image outputted, based on the first image test signal, by the display includes: extracting the first display parameter from the display processor of the display.

For example, the microprocessor is an MCU of the display processor; and acquiring of the first display parameters of the at least two frames of image outputted, based on the first image test signal, by the display includes: extracting the first display parameter from the display processor by utilization of the MCU.

For example, the first display parameter or the second display parameter includes at least one of the brightness function value or the chromatic value of the display.

For example, the brightness function value includes a columnar function value.

For example, the microprocessor is further configured to feed back abnormality identification information when it is determined that display abnormality presents in the display.

For example, the display is in signal connection with a server; the calculation apparatus is further configured to receive the abnormality identification information from the microprocessor and feed back the abnormality identification information to the server.

Figure 5:
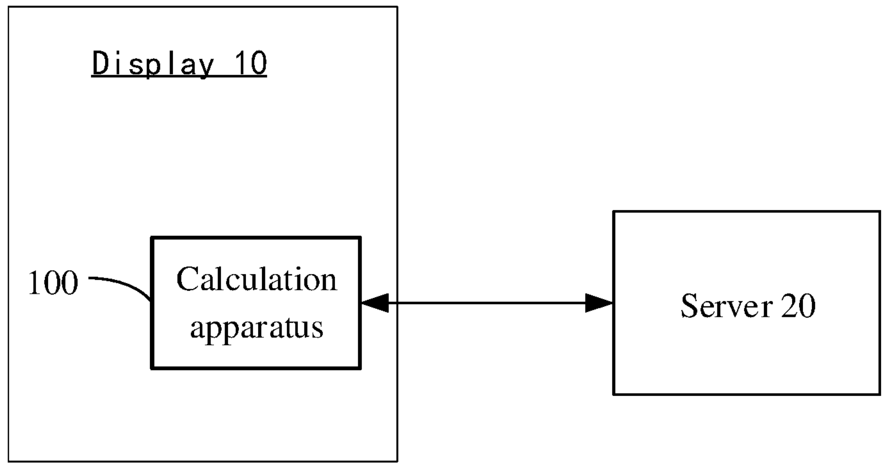
FIG. 5 is a schematic diagram illustrating the connection relationship between the display provided by an embodiment of the present disclosure and the server.

FIG. 5 is a schematic diagram illustrating the connection relationship between the display provided by an embodiment of the present disclosure and the server. As illustrated in FIG. 5, a display 10 may be in signal connection with a server 20. The server is, for example, a cloud server. According to an example of the present disclosure, a calculation apparatus 100 of the display may also feed back the abnormality identification information to the server 20. By this way, the server-side staff can keep abreast of the display status of each display, determine abnormal displays, and analyze and process the abnormal conditions, or send staff to the site for inspection and maintenance, and then labor costs can be effectively reduced.

It should be appreciated by those skilled in the art that the elements and the algorithm steps of the examples described in connection with the embodiments disclosed herein can be implemented by electronic hardware, computer software, or a combination of both. And a software module can be placed in a computer storage medium of any form. To clearly illustrate the interchangeability of hardware and software, the components and the steps of the examples have been generally described in terms of functionality in the above description. Whether or not these functions are performed in hardware or software depends on the specific application and the design constraints of the technical proposal. Those skilled in the art can use different methods to implement the described functions for each particular application, but such implementation should not be considered beyond the scope of the present disclosure.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. A self-monitoring method of a display, comprising:

inputting a first image test signal, wherein the first image test signal comprises a predetermined image test signal, and the first image test signal comprises playing signals of at least two frames of test image that are played in turn by switching;

acquiring a display parameter of the predetermined image test signal of the first image test signal;

dividing each frame of image of at least two frames of image outputted, based on the first image test signal, by the display, into a plurality of areas respectively, wherein the plurality of areas of each frame of image of the at least two frames of image comprise a predetermined area corresponding to the predetermined image test signal and a remaining area excluding the predetermined area in each frame of image, and the predetermined image test signal is a dynamic test signal corresponding to the at least two frames of test image of the first image test signal to be played in turn;

acquiring a first display parameter of the predetermined area of each frame of image of the outputted at least two frames of image, wherein the predetermined area of each frame of image of the at least two frames of image corresponds to a corresponding first display parameter;

comparing the display parameter of the predetermined image test signal with the first display parameter, and determining whether or not an image displayed by the display is matched with the first image test signal so as to acquire a first match result; and determining whether or not display abnormality presents in the display based on the first match result.

2. The method according to claim 1, wherein the at least two frames of test image of the first image test signal are configured to be played in turn at a certain time interval or in a preset sequence.

3. The method according to claim 1, wherein the at least two frames of test image of the first image test signal comprise pure color pictures with different colors.

4. The method according to claim 3, wherein the different colors comprise at least two kinds of red, green and blue.

5. The method according to claim 1, wherein comparing the display parameter of the predetermined image test signal with the first display parameter and determining whether or not the image displayed by the display is matched with the first image test signal comprises:

comparing at least two first display parameters corresponding to the at least two frames of image so as to acquire a comparison result;

determining a variation value between the at least two first display parameters according to the comparison result; and determining whether or not a change of the images displayed by the display is matched with the first image test signal according to the display parameter of the predetermined image test signal and the variation value between the at least two first display parameters.

6. The method according to claim 5, wherein a predetermined variation value exists between at least two display parameters corresponding to at least two frames of image corresponding to the predetermined image test signal of the first image test signal; and determining of whether or not the change of the images displayed by the display is matched with the first image test signal according to the display parameter of the predetermined image test signal and the variation value between the at least two first display parameters comprises:

comparing the variation value between the at least two first display parameters with the pre-determined variation value;

determining whether or not the variation value between the at least two first display parameters is matched with the pre-determined variation value so as to acquire a second match result; and determining whether or not the change of the images displayed by the display is matched with the first image test signal based on the second match result.

7. The method according to claim 1, wherein comparing the display parameter of the predetermined image test signal with the first display parameter, and determining whether or not the image displayed by the display is matched with the first image test signal comprises:

comparing at least two first display parameters corresponding to the at least two frames of image with display parameters of the predetermined image test signal respectively, and acquiring a first difference value between each of the at least two first display parameters and the corresponding display parameter of the predetermined image test signal; and comparing the first difference value with a corresponding first preset difference threshold, and determining whether or not the image displayed by the display is matched with the first image test signal.

8. The method according to claim 1, wherein the remaining area comprises one or more sub-areas, and the method further comprises:

acquiring the first display parameters of the one or more sub-areas of the remaining area of the outputted at least two frames of image, wherein each of the one or more sub-areas corresponds to a first display parameter; and comparing the display parameters of the first image test signal with the first display parameters of the one or more sub-areas of the remaining area of the outputted at least two frames of image, and determining whether or not the image displayed by the display is matched with the first image test signal.

9. The method according to claim 8, wherein comparing the display parameters of the first image test signal with the first display parameters of the one or more sub-areas of the remaining area of the outputted at least two frames of image, and determining whether or not the image displayed by the display is matched with the first image test signal comprises:

allowing one or more sub-areas of the remaining area in one of the at least two frames of image to correspond to one or more sub-areas of the remaining area in another one of the at least two frames of image according to positions of the one or more sub-areas of the remaining area of the at least two frames of image; and comparing the display parameters of the first image test signal with first display parameters of one or more corresponding sub-areas of the at least two frames of image, and determining whether or not the images displayed by the display are matched with the first image test signal.

10. The method according to claim 9, wherein comparing the display parameters of the first image test signal with the first display parameters of the one or more corresponding sub-areas and determining whether or not the images displayed by the display are matched with the first image test signal comprises:

respectively comparing first display parameters of each corresponding sub-area;

determining a variation value between the first display parameters of the each corresponding sub-area according to the comparison result; and respectively determining whether or not an image displayed by the each corresponding sub-area is matched with the first image test signal according to the display parameter of the first image test signal and variation values between the first display parameters of the one or more corresponding sub-areas of the at least two frames of image.

11. The method according to claim 10, wherein the first image test signal comprises playing signals of at least two frames of test image, and a pre-determined variation value exists between at least two display parameters corresponding to the playing signals of the at least two frames of test image; and respectively determining of whether or not the image displayed by the each corresponding sub-area is matched with the first image test signal according to the display parameter of the first image test signal and the variation values between the first display parameters of the one or more corresponding sub-areas of the at least two frames of image comprises:

comparing the variation value of the each corresponding sub-area with the pre-determined variation value;

determining whether or not the variation value of the each corresponding sub-area is matched with the pre-determined variation value so as to acquire a third match result; and determining whether or not a change of the images displayed by the display is matched with the first image test signal according to the third match result.

12. The method according to claim 10, wherein comparing the display parameter of the first image test signal with the first display parameters of the one or more of corresponding sub-areas and determining whether or not the images displayed by the display are matched with the first image test signal further comprises:

determining a ratio, which is taken as an area ratio, of corresponding sub-areas, which is not matched with the first image test signal, in the one or more corresponding sub-areas of the at least two frames of image to all the corresponding areas; and determining whether or not the images displayed by the display are matched with the first image test signal according to the area ratio, wherein it is determined that the images displayed by the display are matched with the first image test signal when the area ratio is less than or equal to an area ratio threshold; and it is determined that the images displayed by the display are unmatched with the first image test signal when the area ratio is greater than the area ratio threshold.

13. The method according to claim 8, wherein comparing the display parameters of the first image test signal with the first display parameters of the one or more sub-areas of the remaining area of the outputted at least two frames of image, and determining whether or not the image displayed by the display is matched with the first image test signal comprises:

comparing the first display parameters of the one or more sub-areas of the remaining area of the at least two frames of image with the display parameters of the first image test signal, and acquiring a second difference value between each of the first display parameters of the one or more sub-areas of the remaining area of the at least two frames of image and the corresponding display parameter of the first image test signal; and comparing the second difference value with a corresponding second preset difference threshold, and determining whether or not the image displayed by the display is matched with the first image test signal.

14. The method according to claim 1, wherein acquiring the first display parameter of the predetermined area of each frame of image of the outputted at least two frames of image comprises:

extracting the first display parameter from a timing controller of the display, or extracting the first display parameter from a display processor of the display.

15. The method according to claim 14, wherein acquiring the first display parameter of the predetermined area of each frame of image of the outputted at least two frames of image comprises:

extracting the first display parameter from the timing controller through a microcontroller unit of the display; or extracting the first display parameter from the display processor through a microcontroller unit of the display processor.

16. The method according to claim 1, wherein the first display parameter comprises at least one of a brightness function value, a chromatic value or a color coordinate of the at least two frames of image outputted based on the first image test signal.

17. The method according to claim 1, wherein the display is in signal connection with a server; and the method further comprises:

generating abnormality identification information when it is determined that the display abnormality presents in the display; and feeding back the abnormality identification information to the server.

18. The method according to claim 1, further comprising: the display parameter of the predetermined image test signal and the first display parameter being acquired by the display, and an analysis report being generated according to a comparison result between the display parameter of the predetermined image test signal and the first display parameter.

19. A display, comprising: a calculation apparatus and a processing controller, wherein the calculation apparatus is connected with the processing controller;

the display further comprises a microprocessor connected with the processing controller, or the processing controller comprises a microprocessor;

the calculation apparatus is configured to input a first image test signal into the processing controller, wherein the first image test signal comprises a predetermined image test signal, and the first image test signal comprises playing signals of at least two frames of test image that are played in turn by switching;

the processing controller is configured to output at least two frames of image based on the first image test signal, wherein each frame of image of the at least two frames of image is divided into a plurality of areas respectively, and the plurality of areas of each frame of image of the at least two frames of image comprise a predetermined area corresponding to the predetermined image test signal and a remaining area excluding the predetermined area in each frame of image, and the predetermined image test signal is a dynamic test signal corresponding to the at least two frames of test image of the first image test signal to be played in turn; and the microprocessor is configured to:

acquire a display parameter of the predetermined image test signal of the first image test signal and a first display parameter of the predetermined area of each frame of image of the at least two frames of image;

compare the display parameter of the predetermined image test signal with the first display parameter, determine whether or not an image displayed by the display is matched with the first image test signal so as to acquire a first match result; and determine whether or not display abnormality presents in the display based on the first match result, wherein the predetermined area of each frame of image of the at least one frame of image corresponds to a corresponding first display parameter.

20. The display according to claim 19, wherein the processing controller comprises a timing controller or a display processor; and acquiring the first display parameter of the predetermined area of each frame of image of the outputted at least two frames of image comprises:

extracting the first display parameters from the timing controller of the display, or extracting the first display parameters from the display processor of the display.

21. The display according to claim 19, wherein the processing controller comprises a timing controller and a display processor;

when the display further comprises a microprocessor connected with the processing controller, the microprocessor is connected with the timing controller, and the microprocessor comprises a microcontroller unit; and acquiring the first display parameter of the predetermined area of each frame of image of the outputted at least two frames of image comprises: extracting the first display parameter from the timing controller of the display by utilization of the microcontroller unit.

22. The display according to claim 19, the processing controller comprises a timing controller and a display processor; and when the processing controller comprises the microprocessor, the display processor comprises the microprocessor, and the microprocessor comprises a microcontroller unit; and acquiring the first display parameter of the predetermined area of each frame of image of the at least two frames of image outputted, based on the first image test signal, by the display comprises: extracting the first display parameter from the display processor by utilization of the microcontroller unit.

* * * * *